United States Patent  (10) Patent No.: US 11,247,304 B2
Kuriya et al.  (45) Date of Patent: Feb. 15, 2022

(54) WORKPIECE INFORMATION RECOGNITION SYSTEM

(71) Applicant: DMG MORI CO., LTD., Yamatokoriyama (JP)

(72) Inventors: Tatsuhiko Kuriya, Yamatokoriyama (JP); Katsuhito Miyahara, Yamatokoriyama (JP); Keiichi Kiriyama, Yamatokoriyama (JP)

(73) Assignee: DMG MORI CO., LTD., Yamatokoriyama (JP)

(*) Notice: Subject to any disclaimer, the term of this patent is extended or adjusted under 35 U.S.C. 154(b) by 176 days.

(21) Appl. No.: 16/640,618

(22) PCT Filed: Aug. 20, 2018

(86) PCT No.: PCT/JP2018/030649
§ 371 (c)(1),
(2) Date: Feb. 20, 2020

(87) PCT Pub. No.: WO2019/039431
PCT Pub. Date: Feb. 28, 2019

(65) Prior Publication Data
US 2020/0171651 A1 Jun. 4, 2020

(30) Foreign Application Priority Data
Aug. 22, 2017 (JP) .............................. JP2017-159253

(51) Int. Cl.
*B23Q 7/14* (2006.01)
*B23Q 7/04* (2006.01)
(Continued)

(52) U.S. Cl.
CPC ........... *B23Q 7/1426* (2013.01); *B23Q 7/047* (2013.01); *B23Q 7/048* (2013.01);
(Continued)

(58) Field of Classification Search
CPC .......................... B23Q 7/1426; B23Q 17/2452
See application file for complete search history.

(56) References Cited

U.S. PATENT DOCUMENTS 6,047,958 A * 4/2000 Marinkovic ........... B23Q 3/061
269/43
6,099,237 A * 8/2000 Pfiffner .................... B23Q 7/04
414/744.3
(Continued)

FOREIGN PATENT DOCUMENTS

JP 60-103624 U 7/1985
JP 1-164543 A 6/1989
(Continued)

OTHER PUBLICATIONS

International Search Report dated Oct. 30, 2018 in PCT/JP2018/030649 filed Aug. 20, 2018, 2 pages.

*Primary Examiner* — Thomas Randazzo
(74) *Attorney, Agent, or Firm* — Oblon, McClelland, Maier & Neustadt, L.L.P.

(57) ABSTRACT

A workpiece information recognition system includes a workpiece placing tool (20) capable of placing a workpiece, a reference block (31) detachably provided on workpiece placing tool (20), an information detector configured to detect information about reference block (31), and a control device configured to receive the information of reference block (31) from the information detector. The control device includes a storage configured to store data on a relationship between the information about reference block (31) and information about the workpiece and a controller configured to recognize the information about the workpiece placed on workpiece placing tool (20) by checking the information about reference block (31) detected by the information detector with the data stored in the storage. With this configuration, the workpiece information recognition sys- (Continued)

tem capable of easily cope with a change in a type of the workpiece is provided.

5 Claims, 10 Drawing Sheets

(51) Int. Cl.
  *B23Q 17/24* (2006.01)
  *B25J 5/04* (2006.01)
  *B25J 9/00* (2006.01)
  *B25J 9/16* (2006.01)
  *B25J 18/00* (2006.01)

(52) U.S. Cl.
  CPC ............ *B23Q 17/2452* (2013.01); *B25J 5/04* (2013.01); *B25J 9/0093* (2013.01); *B25J 9/0096* (2013.01); *B25J 9/1602* (2013.01); *B25J 9/1664* (2013.01); *B25J 18/00* (2013.01); *B23Q 2716/08* (2013.01)

(56) References Cited

U.S. PATENT DOCUMENTS

| | | | |
|---|---|---|---|
| 10,065,217 | B2 | 9/2018 | Nagatsuka |
| 2016/0039063 | A1* | 2/2016 | Nakajima ................ B25J 9/026 82/124 |
| 2016/0214143 | A1 | 7/2016 | Nagatsuka |
| 2017/0129063 | A1* | 5/2017 | Bruder ................ B23Q 7/1494 |
| 2017/0355052 | A1* | 12/2017 | Kormann ............ B23Q 3/1554 |

FOREIGN PATENT DOCUMENTS

| | | |
|---|---|---|
| JP | 2-52399 U | 4/1990 |
| JP | 4-244352 A | 9/1992 |
| JP | 2002-181835 | 6/2002 |
| JP | 2016-137551 A | 8/2016 |

* cited by examiner

| SIZE OF REFERENCE BLOCK (VERTICAL AND WIDTH LENGTHS) | SIZE OF WORKPIECE (DIAMETER, HEIGHT) |
|---|---|
| L1 | D1,H1 |
| L2 | D2,H2 |
| L3 | D3,H3 |

| SHAPE OF REFERENCE BLOCK (PLANAR VIEW) | PROCESSING STATE | PROCESSING METHOD |
|---|---|---|
| SQUARE | UNPROCESSED | PROCESSING PROGRAM H |
| RECTANGLE (VERTICALITY > WIDTH) | FIRST INTERMEDIATE WORKPIECE | PROCESSING PROGRAM I |
| RECTANGLE (VERTICALITY < WIDTH) | SECOND INTERMEDIATE WORKPIECE | PROCESSING PROGRAM J |

FIG.10

| POSITION OF REFERENCE BLOCK | DISPOSITION OF WORKPIECE |
|---|---|
| (X1,Y1,Z1) | FOUR COLUMNS BY FIVE ROWS CENTER COORDINATE OF EACH WORKPIECE |
| (X2,Y2,Z2) | SIX COLUMNS BY SIX ROWS CENTER COORDINATE OF EACH WORKPIECE |
| (X3,Y3,Z3) | SEVEN COLUMNS BY EIGHT ROWS CENTER COORDINATE OF EACH WORKPIECE |

WORKPIECE INFORMATION RECOGNITION SYSTEM

TECHNICAL FIELD

The present invention relates to a workpiece information recognition system.

BACKGROUND ART

In relation to a conventional workpiece information recognition system, for example, Japanese Utility Model Laying-Open No. 2-52399 discloses a board management device used to manage data on various boards such as a printed wiring board (PTL 1).

The board management device disclosed in PTL 1 includes a tray that accommodates the board and is individualized with an identification mark, recognition means for determining the tray from the identification mark, and data processing means for storing the data on the board accommodated in the tray together with the tray recognition data obtained by the recognition display and for enabling any data on the accommodated substrate to be extracted from the stored identification data on the tray. As an identification mark attached to the tray, an identification hole is provided in the tray, or a barcode is printed.

CITATION LIST

Patent Literature

PTL 1: Japanese Utility Model Laying-Open No. 2-52399

SUMMARY OF INVENTION

Technical Problem

As disclosed in PTL 1, a technique of providing the identification mark such as the identification hole or the barcode on the tray that accommodate the board is known in order to recognize the information about the board. It is conceivable to apply the technique to an information recognition system for the workpiece placed on a workpiece placing tool. However, in this case, every time a type of the workpiece is changed, it is necessary to prepare the workpiece placing tool including the identification mark corresponding to the workpiece. As a result, the number of workpiece placing tools increases, or preparation work in advance becomes complicated, and it is not possible to easily cope with a change in the type of the workpiece.

An object of the present invention is to solve the above-described problem, and to provide a workpiece information recognition system capable of easily coping with the change in the type of the workpiece.

Solution to Problem

According to the present invention, a workpiece information recognition system includes a workpiece placing tool capable of placing a workpiece, a reference object detachably provided on the workpiece placing tool, an information detector configured to detect information about the reference object, and a control device configured to receive the information about the reference object from the information detector. The control device includes a storage configured to store data on a relationship between the information about the reference object and information about the workpiece and a controller configured to recognize the information about the workpiece placed on the workpiece placing tool by checking the information about the reference object detected by the information detector with the data stored in the storage.

Advantageous Effects of Invention

According to the present invention, the workpiece information recognition system capable of easily coping with the change in the type of the workpiece can be provided.

DESCRIPTION OF EMBODIMENT

An embodiment of the present invention will be described with reference to the drawings. In the drawings referred to below, the same or corresponding member is denoted by the same reference numeral.

Figure 1:
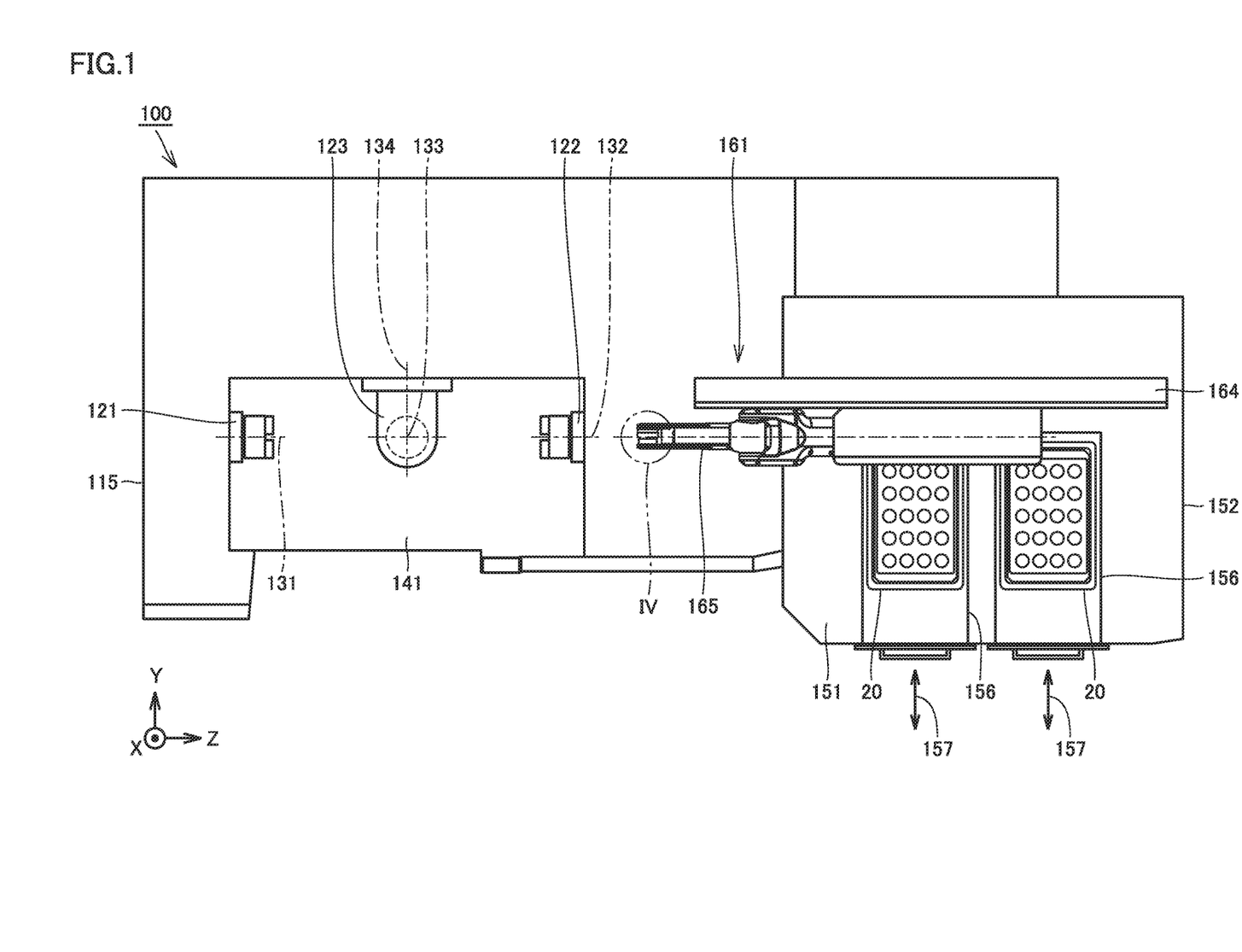
FIG. 1 is a plan view illustrating a machine tool to which a workpiece information recognition system according to an embodiment of the present invention is applied.

FIG. 1 is a plan view illustrating a machine tool to which a workpiece information recognition system according to an embodiment of the present invention is applied.

Referring to FIG. 1, the workpiece information recognition system of the embodiment is a system that recognizes workpiece information. In the embodiment, as an example, the workpiece information recognition system is applied to a machine tool 100 that processes a workpiece. Machine tool 100 is a combined processing machine having a turning function using a stationary tool and a milling function using a rotating tool.

A basic configuration of machine tool 100 will first be described. Machine tool 100 (workpiece information recognition system) includes a first spindle 121, a second spindle 122, a tool spindle 123, and a splash guard 115. First spindle 121, second spindle 122, and tool spindle 123 are provided in a processing area 141.

First spindle 121 and second spindle 122 are opposite each other in a Z-axis direction extending in a horizontal direction. First spindle 121 is provided so as to be rotatable about a center axis 131 parallel to a Z-axis, and second spindle 122 is provided so as to be rotatable about a center axis 132 parallel to the Z-axis. A chuck mechanism that detachably holds the workpiece is provided in first spindle 121 and second spindle 122. Second spindle 122 is provided so as to be movable in the Z-axis direction.

Tool spindle 123 holds the stationary tool during turning of a workpiece, or holds the rotating tool during milling of the workpiece, and rotates around a center axis 133. A clamp mechanism that detachably holds the tool is provided in tool spindle 123. Tool spindle 123 is provided so as to be movable in an X-axis direction extending in a vertical direction, a Y-axis direction extending in the horizontal direction and being orthogonal to the Z-axis direction, and the Z-axis direction. Tool spindle 123 is further provided so as to be turnable about a center axis 134 parallel to a Y-axis.

Splash guard 115 has an appearance of machine tool 100 together with a cover body 152 (to be described later). Splash guard 115 defines processing area 141.

Machine tool 100 (workpiece information recognition system) further includes a workpiece conveyance unit 161, cover body 152, and a workpiece placing tool 20. Workpiece conveyance unit 161 conveys the workpiece between processing area 141 and a workpiece storage area 151.

Cover body 152 defines workpiece storage area 151. Workpiece storage area 151 is provided adjacent to processing area 141. Workpiece storage area 151 is provided adjacent to processing area 141 in the Z-axis direction. Processing area 141 and workpiece storage area 151 are separated from each other by a shutter (not illustrated) that can be opened and closed.

Workpiece conveyance unit 161 includes a moving mechanism unit 164 and a robot arm 165. Robot arm 165 extends in an arm shape from moving mechanism unit 164. Robot arm 165 is configured to be capable of holding the workpiece. Robot arm 165 is configured such that the held workpiece can freely be moved in a space while an orientation of the held workpiece can freely be changed. Robot arm 165 is a robot arm capable of controlling six axes independently of each other.

Moving mechanism unit 164 moves robot arm 165 between processing area 141 and workpiece storage area 151. Moving mechanism unit 164 linearly reciprocates robot arm 165 along the Z-axis direction. Moving mechanism unit 164 includes a linear guide that guides robot arm 165 in a direction parallel to the Z-axis, a servomotor that outputs rotational motion, and a rack and pinion that converts the rotational motion output from the servomotor into a linear motion to move robot arm 165 in the Z-axis direction.

The workpiece conveyance unit in the present invention is not particularly limited as long as the workpiece can be conveyed, and may be, for example, a three-axis loader movable in three axes of the X-axis, the Y-axis, and the Z-axis.

Figure 2:
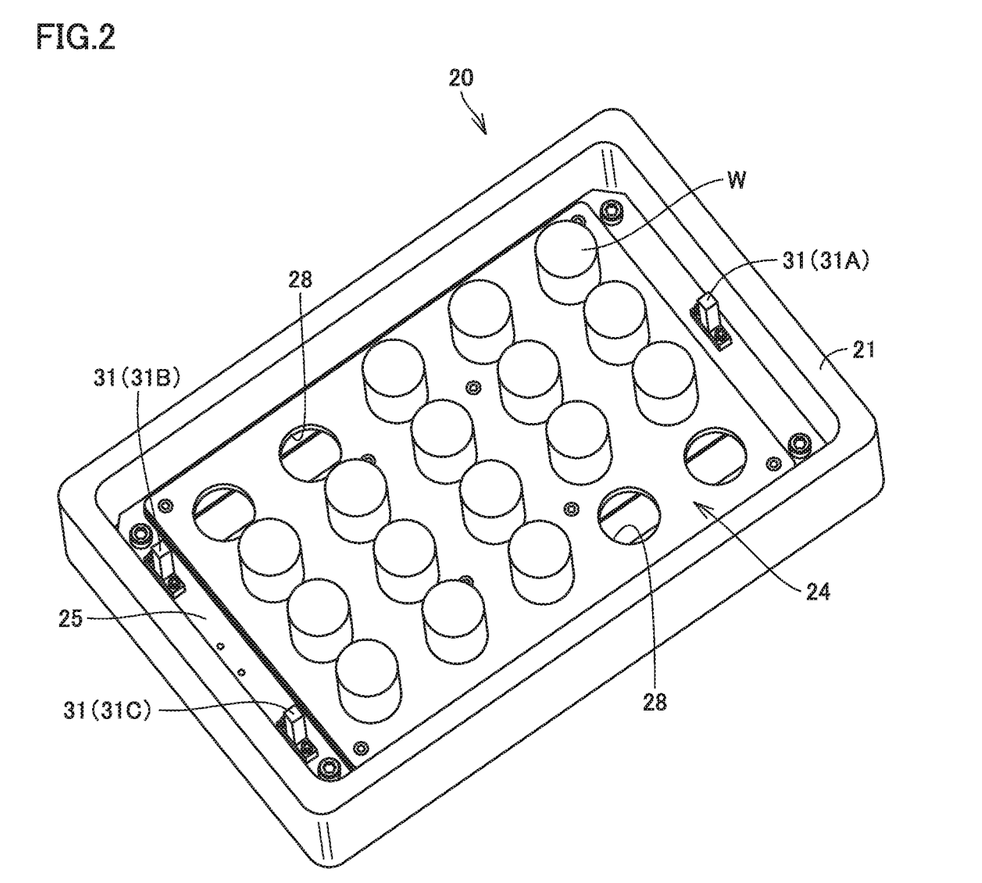
FIG. 2 is a perspective view illustrating a workpiece placing tool disposed in a workpiece storage area in FIG. 1.
Figure 3:
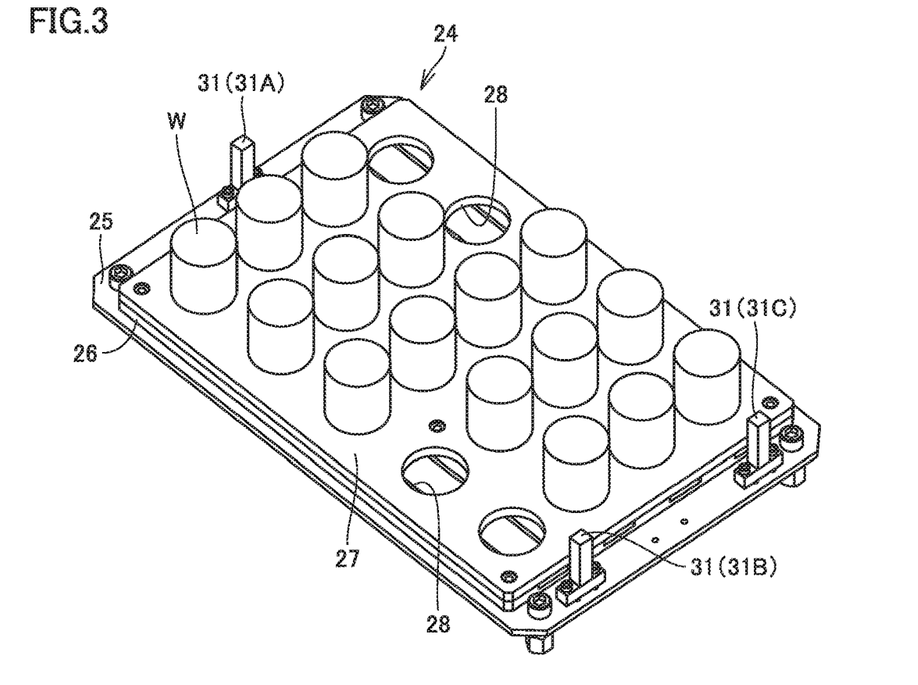
FIG. 3 is a perspective view illustrating a state in which a tray is removed from the workpiece placing tool in FIG. 2.

FIG. 2 is a perspective view illustrating the workpiece placing tool disposed in the workpiece storage area in FIG. 1. FIG. 3 is a perspective view illustrating a state in which a tray is removed from the workpiece placing tool in FIG. 2.

Referring to FIGS. 1 to 3, machine tool 100 (workpiece information recognition system) includes workpiece placing tool 20 and a drawer 156.

Drawer 156 is provided in a machine front surface of cover body 152. As indicated by an arrow 157 in FIG. 1, drawer 156 is provided so as to be slidable along the Y-axis direction. Drawer 156 is provided so as to be slidable between a closed state in which drawer 156 is pushed toward workpiece storage area 151 and an open state in which drawer 156 is pulled out from workpiece storage area 151 to the front of the machine.

Workpiece placing tool 20 is configured such that a workpiece W can be placed thereon. Workpiece placing tool 20 is configured such that a plurality of workpieces W can be placed thereon. Workpiece placing tool 20 is disposed in workpiece storage area 151. Workpiece placing tool 20 is placed on drawer 156. Workpiece placing tool 20 placed on drawer 156 is disposed in workpiece storage area 151 when drawer 156 becomes in the closed state. Workpiece placing tool 20 placed on drawer 156 is disposed outside workpiece storage area 151 when drawer 156 becomes in the open state.

In the embodiment, two sets of workpiece placing tool 20 and drawer 156 are provided side by side in the Z-axis direction. As a typical example, pre-processing workpiece W is placed on one of workpiece placing tools 20, and post-processing workpiece W is placed on the other workpiece placing tool 20. FIGS. 2 and 3 illustrate pre-processing workpiece W having a columnar shape.

Workpiece placing tool 20 has a tray 21 and a plate member (intermediate layer) 24. Tray 21 has a shallow box shape. Plate member 24 is stored in tray 21. Plate member 24 has a planar shape spreading in a flat plate shape as a whole. Plate member 24 is provided parallel to a Y-axis-Z-axis plane while workpiece placing tool 20 is disposed in workpiece storage area 151. Plate member 24 has a rectangular shape in planar view when viewed from the X-axis direction.

Plate member 24 has a base plate 25, a spacer 26, and a top plate 27. Base plate 25 has a planar shape larger than top plate 27. Base plate 25 and top plate 27 overlap each other in a thickness direction of plate member 24. A plurality of openings 28 are provided in top plate 27. Opening 28 penetrates top plate 27 in the thickness direction of plate member 24. Opening 28 includes an opening surface (in the embodiment, a circular opening surface) corresponding to the shape of workpiece W. The plurality of openings 28 are provided in a lattice shape along the Y-axis direction and the Z-axis direction while workpiece placing tool 20 is disposed in workpiece storage area 151.

Spacer 26 has a frame shape extending in a band shape along a periphery of top plate 27. Spacer 26 is interposed between base plate 25 and top plate 27 in the thickness direction of plate member 24. Consequently, a gap is provided between base plate 25 and top plate 27 immediately below opening 28. Workpiece W is inserted into opening 28 and placed on base plate 25, whereby workpiece W is held by plate member 24.

A configuration for recognizing various information about workpiece W placed on workpiece placing tool 20 in workpiece storage area 151 will be described below.

Machine tool 100 (workpiece information recognition system) further includes a reference block 31 as a reference object.

Reference block 31 is provided so as to be detachable on workpiece placing tool 20. A plurality of reference blocks 31 are provided in workpiece placing tool 20. At least three reference blocks 31 are provided in workpiece placing tool 20. A reference block 31A, a reference block 31B, and a reference block 31C are provided in workpiece placing tool 20.

Reference block 31 is provided on plate member 24 of workpiece placing tool 20. Reference block 31 is provided on base plate 25 of plate member 24. Reference block 31 is fastened to workpiece placing tool 20 by bolts. Reference block 31 can be removed from workpiece placing tool 20 by removing the bolts.

The plurality of reference blocks 31 (31A, 31B, 31C) are disposed apart from one another. The plurality of reference blocks 31 are disposed apart from one another in a plane where plate member 24 spreads. The plurality of reference blocks 31 are provided on the periphery of base plate 25 exposed from top plate 27. The plurality of reference blocks 31 are provided in a region outside a region where the plurality of openings 28 are provided (that is, a region where the plurality of workpieces W are held).

Reference block 31A, reference block 31B, and reference block 31C are provided apart from one another in a longitudinal direction of a rectangular shape of plate member 24 in planar view. Reference block 31B and reference block 31C are provided apart from each other in a short direction of the rectangular shape of plate member 24 in planar view. Reference block 31A is provided at a center position between reference block 31B and reference block 31C in the short direction of the rectangular shape of plate member 24 in planar view. Reference block 31A, reference block 31B, and reference block 31C are located at three corners of an isosceles triangle.

A method for detachably providing reference block 31 in workpiece placing tool 20 is not limited to a method in which the bolts are used, and may be, for example, a method in which a clip or fitting is used. The positions where reference block 31A, reference block 31B, and reference block 31C are provided are not particularly limited. However, according to the configuration described above, reference block 31A, reference block 31B, and reference block 31C can be disposed far apart from one another in the plane where plate member 24 spreads.

Reference block 31 is a solid. Reference block 31 has a convex shape protruding from base plate 25. In the embodiment, reference block 31 is formed by a square pole block. In a state in which workpiece placing tool 20 is disposed in workpiece storage area 151, reference block 31 has a square pole shape in which a verticality extending in the Y-axis direction and a width extending in the Z-axis direction are equal to each other and a height extending in the X-axis direction is greater than each of the verticality and the width.

Reference block 31 is not limited to the above-described square pole, and may have, for example, a square pole shape having the verticality and the width different from each other. Reference block 31 has the square pole shape in which the height extending in the X-axis direction is equal to each of the verticality and the width, or a square pole shape in which the height extending in the X-axis direction is smaller than each of the verticality and the width. Reference block 31 may have a columnar shape or a triangular shape.

Figure 4:
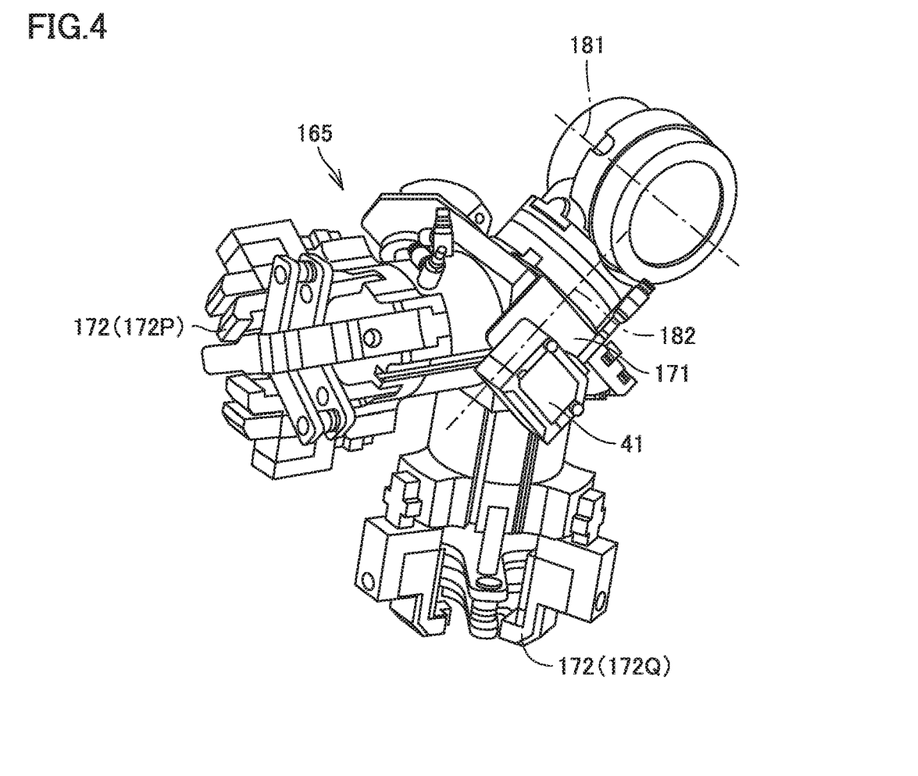
FIG. 4 is a perspective view illustrating a leading end of a robot arm in FIG. 1.

FIG. 4 is a perspective view illustrating a leading end of the robot arm in FIG. 1. Referring to FIGS. 1 and 4, robot arm 165 includes a movable unit 171 and a workpiece holder 172 (172P, 172Q).

Movable unit 171 is provided at a leading end of robot arm 165 extending in an arm shape from moving mechanism unit 164. Movable unit 171 is provided so as to be swingable about a turning axis 181 in FIG. 4, and provided so as to be rotatable about a rotation axis 182 in FIG. 4.

Workpiece holder 172 is provided in movable unit 171. Workpiece holder 172 is configured to detachably hold the workpiece. Workpiece holder 172P and workpiece holder 172Q are provided as workpiece holder 172 in order to simultaneously hold two workpieces.

Machine tool 100 (workpiece information recognition system) further includes an information detector 41. Information detector 41 is configured to detect information about reference block 31. The information about reference block 31 may include information about a size, a shape, or a position of reference block 31.

Information detector 41 is formed by a laser sensor. Information detector 41 includes an emission unit (not illustrated) that emits laser light and a light receiving unit (not illustrated) that receives the laser light emitted from the emission unit and reflected by the object. Information detector 41 can detect positional information about the object based on a light receiving position of the laser light in the light receiving unit and time until the laser light returns from the emission unit to the light receiving unit.

information detector 41 is fixed to workpiece conveyance unit 161. Information detector 41 is fixed to robot arm 165. Information detector 41 is fixed to movable unit 171 of robot arm 165. Information detector 41 is provided adjacent to workpiece holder 172. With this configuration, information detector 41 can freely be moved in the space while the orientation of information detector 41 can freely be changed with the operation of workpiece conveyance unit 161.

information detector in the present invention is not particularly limited as long as information detector can detect various types of information about the reference object, and may be, for example, a contact type stylus. In the embodiment, information detector 41 is fixed to workpiece conveyance unit 161. However, the present invention is not limited to this. For example, a dedicated actuator that moves information detector 41 may be provided.

Figure 5:
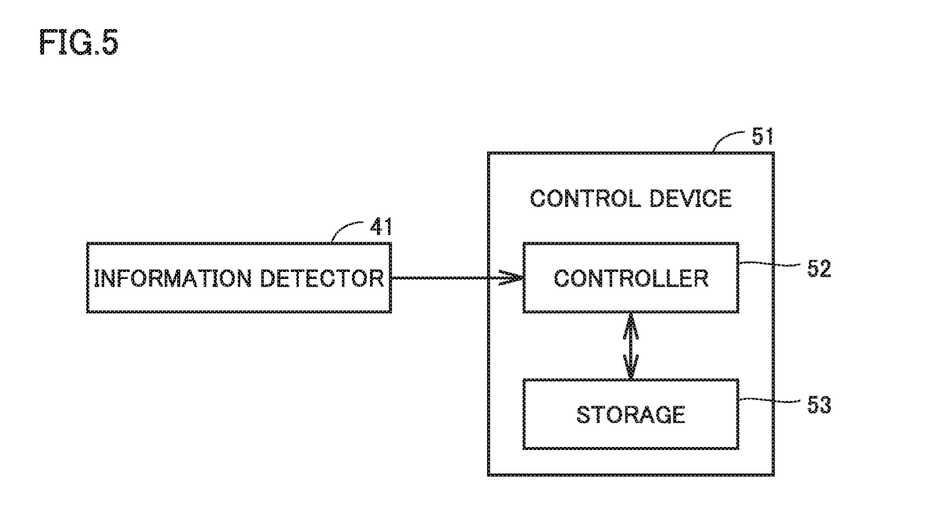
FIG. 5 is a block diagram illustrating a configuration for recognizing information about a workpiece placed on the workpiece placing tool.

FIG. 5 is a block diagram illustrating a configuration for recognizing the information about the workpiece placed on the workpiece placing tool.

Referring to FIGS. 1 and 5, machine tool 100 (workpiece information recognition system) further includes a control device 51. Control device 51 includes a control panel provided on machine tool 100. Control device 51 receives the information about reference block 31 from information detector 41. Control device 51 includes a storage 53 and a controller 52.

Storage 53 stores data on a relationship between the information about reference block 31 and the information about the workpiece. The information about the workpiece may include information about the size, the processing state, the processing method, or the disposition of the workpiece.

Controller 52 recognizes the information about the workpiece placed on workpiece placing tool 20 by checking the information about reference block 31 detected by information detector 41 with the data stored in storage 53.

Figure 6:
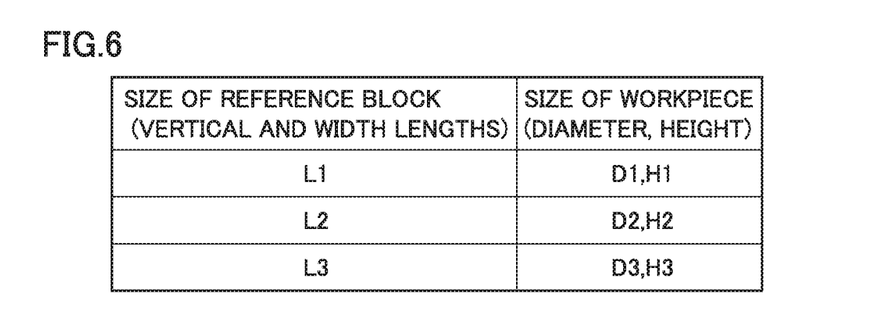
FIG. 6 is a table illustrating an example of data stored in a storage in FIG. 5.
Figure 7:
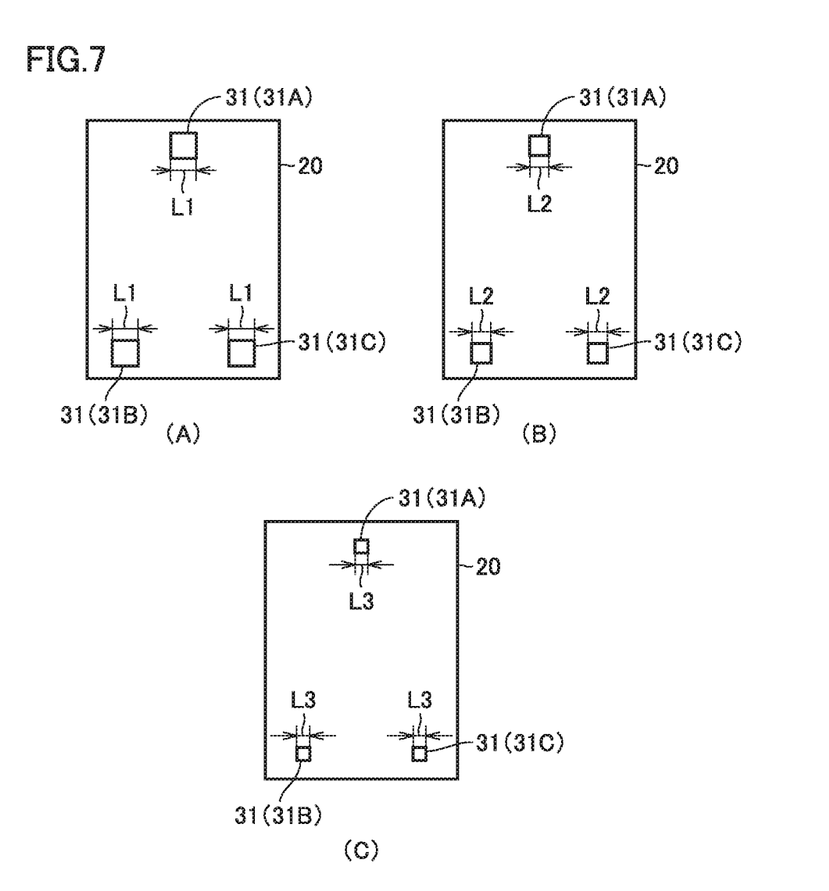
FIG. 7 is a plan view illustrating an example of the workpiece placing tool on which different types of workpieces are placed.
Figure 8:
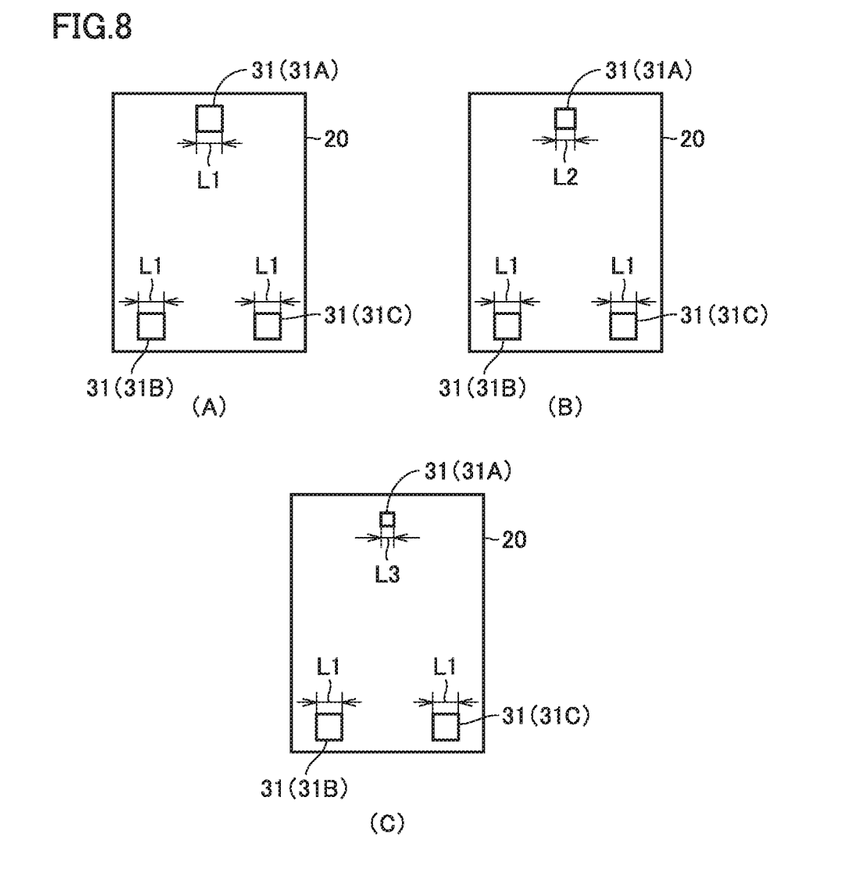
FIG. 8 is a plan view illustrating another example of the workpiece placing tool on which different types of workpieces are placed.

FIG. 6 is a table illustrating an example of the data stored in the storage in FIG. 5. FIG. 7 is a plan view illustrating an example of the workpiece placing tool on which different types of workpieces are placed. FIG. 8 is a plan view illustrating another example of the workpiece placing tool on which different types of workpieces are placed.

Referring to FIGS. 6 to 8, storage 53 may store correspondence between the size of reference block 31 (the vertical and width lengths of the square-pole shaped reference block 31 in planar view) and the size of workpiece W (a diameter and the height of columnar-shaped workpiece W). More specifically, storage 53 may store vertical and width lengths L1 of reference block 31 and a diameter D1 and a height H1 of workpiece W while associating vertical and width lengths L1 of reference block 31 with diameter D1 and height H1 of workpiece W, store vertical and width lengths L2 of reference block 31 and a diameter D2 and a height H2 of workpiece W while associating vertical and width lengths L2 of reference block 31 with diameter D2 and height H2 of workpiece W, and store vertical and width lengths L3 of reference block 31 and a diameter D3 and a height H3 of workpiece W while associating vertical and width lengths L3 of reference block 31 with diameter D3 and height H3 of workpiece W.

At this point, as illustrated in FIG. 7, all of reference block 31A, reference block 31B, and reference block 31C may have the size indicating the information about workpiece W. As illustrated in FIG. 8, reference block 31A may have the size indicating the information about workpiece W, and reference block 31B and reference block 31C may be used only to detect an inclination of plate member 24 (to be described later).

Figure 9:
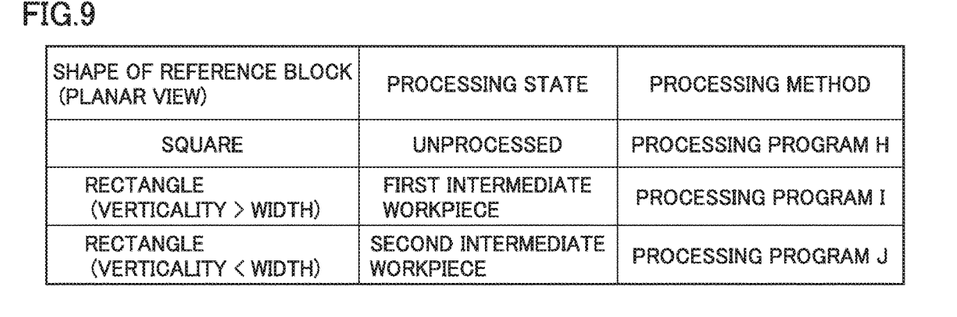
FIG. 9 is a table illustrating another example of the data stored in the storage in FIG. 5.
Figure 10:
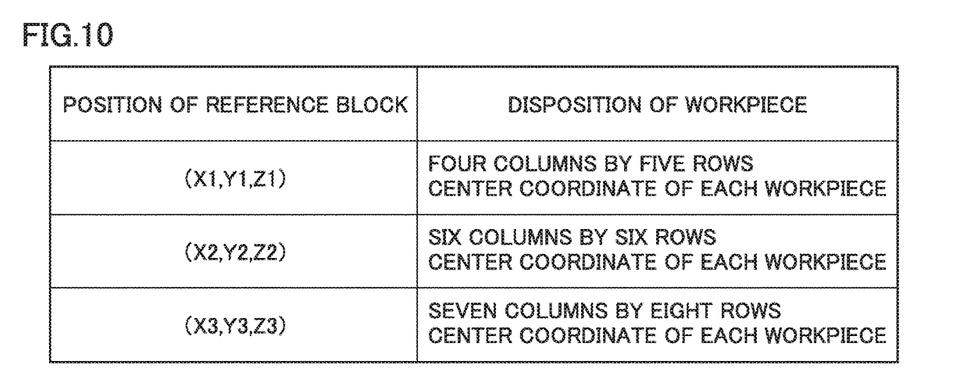
FIG. 10 is a table illustrating still another example of the data stored in the storage in FIG. 5.

FIG. 9 is a table illustrating another example of the data stored in the storage in FIG. 5. FIG. 10 is a table illustrating still another example of the data stored in the storage in FIG. 5.

Referring to FIG. 9, storage 53 may store the correspondence between the shape of reference block 31 (the shape of reference block 31 in planar view), the processing state of workpiece W, and the processing method of workpiece W. More specifically, storage 53 may store the square shape of reference block 31 and the fact that the processing state of workpiece W is unprocessed and the method for processing workpiece W is the processing using a processing program H while associating the square shape of reference block 31 with the fact that the processing state of workpiece W is unprocessed and the method for processing workpiece W is the processing using processing program H, store the shape of the rectangle (verticality>width) of reference block 31 and the fact that the processing state of workpiece W is a first intermediate workpiece and the method for processing workpiece W is the processing using a processing program I while associating the shape of the rectangle (verticality>width) of reference block 31 and the fact that the processing state of workpiece W is the first intermediate workpiece and the method for processing workpiece W is the processing using processing program I, and store the shape of the rectangle (verticality<width) of reference block 31 and the fact that the processing state of workpiece W is a second intermediate workpiece and the method for processing workpiece W is the processing using a processing program J while associating the shape of the rectangle (verticality<width) of reference block 31 with the fact that the processing state of workpiece W is the second intermediate workpiece and the method for processing workpiece W is the processing using processing program J.

Referring to FIG. 10, storage 53 may store the correspondence between the position of reference block 31 (a coordinate of the center of reference block 31 in planar view) and the disposition of workpiece W (a mode in which a plurality of workpieces W are placed on workpiece placing tool 20 and a center coordinate of each workpiece W in planar view). More specifically, storage 53 may store the center coordinate (X1, Y1, Z1) of reference block 31 and the mode in which the plurality of workpieces W are arranged in four columns in the Z-axis direction and in five rows in the Y-axis direction and the center coordinate of each workpiece W while associating the center coordinate (X1, Y1, Z1) of reference block 31 with the mode in which the plurality of workpieces W are arranged in four columns in the Z-axis direction and in five rows in the Y-axis direction and the center coordinate of each workpiece W, store the center coordinate (X2, Y2, Z2) of reference block 31 and the mode in which the plurality of workpieces W are arranged in six columns in the Z-axis direction and in six rows in the Y-axis direction and the center coordinate of each workpiece W while associating the center coordinate (X2, Y2, Z2) of reference block 31 with the mode in which the plurality of workpieces W are arranged in six columns in the Z-axis direction and in six rows in the Y-axis direction and the center coordinate of each workpiece W, and store the center coordinate (X3, Y3, Z3) of reference block 31 and the mode in which the plurality of workpieces W are arranged in seven columns in the Z-axis direction and in eight rows in the Y-axis direction and the center coordinate of each workpiece W while associating the center coordinate (X3, Y3, Z3) of reference block 31 with the mode in which the plurality of workpieces W are arranged in seven columns in the Z-axis direction and in eight rows in the Y-axis direction and the center coordinate of each workpiece W.

The data stored in storage 53 described above is an example, and a combination of a content of the information about reference block 31, a content of the information about the workpiece, and the information about reference block 31 and the information about the workpiece associated with each other is not particularly limited.

Figure 11:
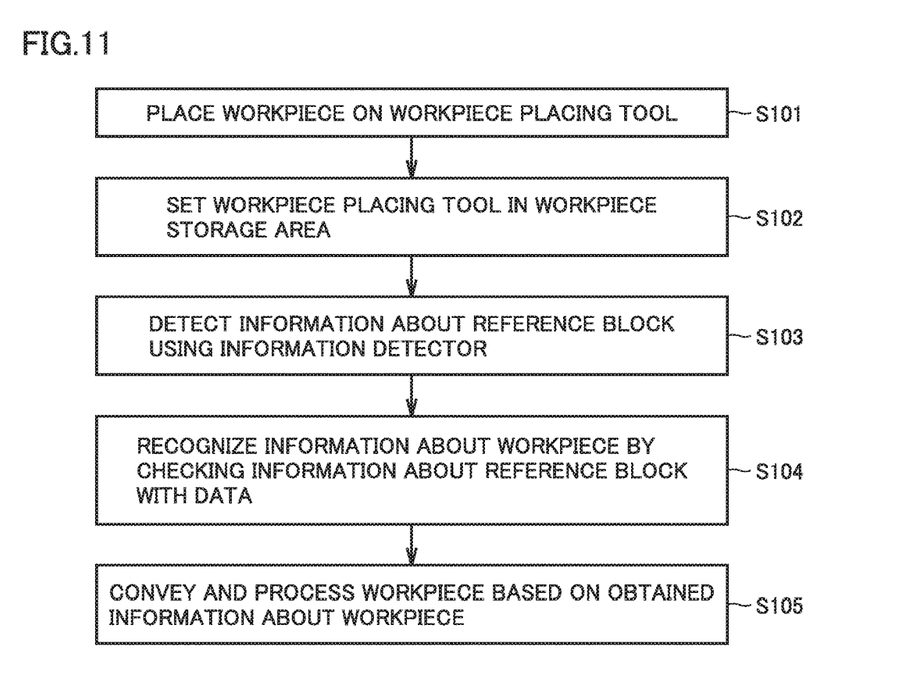
FIG. 11 is a flowchart illustrating steps of recognizing the information about the workpiece placed on the workpiece placing tool.
Figure 12:
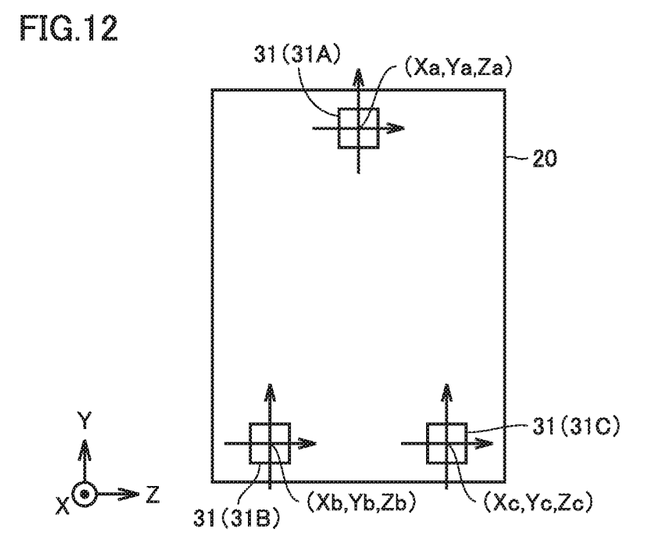
FIG. 12 is a plan view illustrating a method of scanning a reference block with laser light in the steps of recognizing the information about the workpiece in FIG. 11.
Figure 13:
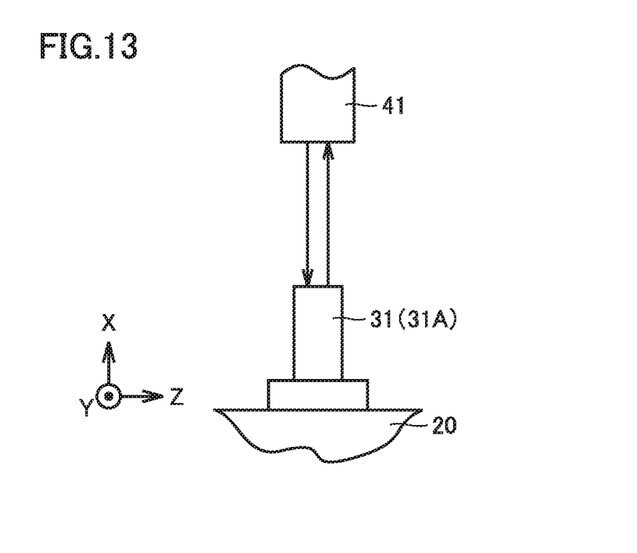
FIG. 13 is a plan view illustrating the method of scanning the reference block with the laser light in the steps of recognizing the information about the workpiece in FIG. 11.
Figure 14:
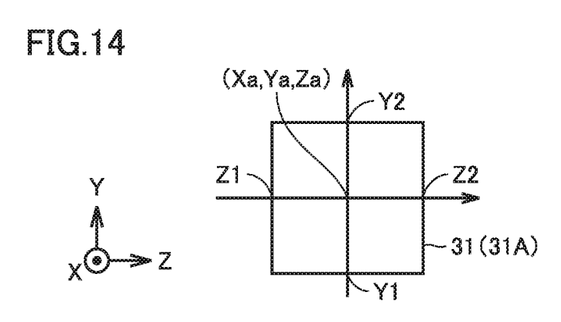
FIG. 14 is a plan view illustrating the method of scanning the reference block with the laser light in the steps of recognizing the information about the workpiece in FIG. 11.

FIG. 11 is a flowchart illustrating steps of recognizing the information about the workpiece placed on the workpiece placing tool. FIGS. 12 to 14 are plan views each illustrating a method for scanning the reference block with the laser light in steps of recognizing the information about the workpiece in FIG. 11.

The step of recognizing the information on workpiece W placed on workpiece placing tool 20 based on the information about reference block 31 (31A, 31B, 31C) provided on workpiece placing tool 20 will be described below.

Referring to FIGS. 1 to 3 and 11, the plurality of workpieces W are placed on workpiece placing tool 20 (S101). In this step, the plurality of workpieces W are inserted into the plurality of openings 28, respectively.

Subsequently, workpiece placing tool 20 is set in workpiece storage area 151 (S102). In this step, workpiece placing tool 20 is placed on drawer 156 in the open state. By putting drawer 156 in the closed state, workpiece placing tool 20 is disposed in workpiece storage area 151.

Referring to FIGS. 7 to 14, information detector 41 detects the information about reference block 31 (31A, 31B, 31C) (S103).

In this step, information detector 41 is positioned above reference block 31 by operating workpiece conveyance unit 161 (moving mechanism unit 164, robot arm 165). Workpiece conveyance unit 161 is operated while the laser light is emitted downward from information detector 41, thereby performing scanning with the laser light in each of the Z-axis direction and the Y-axis direction. Along with the scanning of the laser light, information detector 41 receives the reflected light of the laser light. At this point, a difference in the time the laser light returns to information detector 41 is generated between the position where reference block 31 exists and the position where reference block 31 does not exist. The size of reference block 31 (the vertical and width lengths of reference block 31 in planar view) and the shape of reference block 31 (the shape of reference block 31 in planar view) are detected based on the operation position of workpiece conveyance unit 161 at timing of generating the difference in the return time of the laser light. The position of reference block 31 (the center coordinate of reference block 31 in planar view) is detected by considering both the return time of the laser light and the operation position of workpiece conveyance unit 161.

The scanning of the laser light is performed on each of reference block 31A, reference block 31B, and reference block 31C. Consequently, the center coordinate (Xa, Ya, Za) of reference block 31A in planar view, the center coordinate (Xb, Yb, Zb) of reference block 31B in planar view, and the center coordinate (Xc, Ye, Zc) of reference block 31C in planar view are detected.

In the embodiment, information detector 41 is provided in workpiece conveyance unit 161 that conveys the workpiece, so that information detector 41 can be moved toward reference block 31 without adding a new actuator. Furthermore, accessibility of information detector 41 to reference block 31 can be improved.

Subsequently, controller 52 recognizes the information about workpiece W by checking the information about reference block 31 with the data stored in storage 53 (S104).

In ibis step, controller 52 recognizes the information about the size of workpiece W (FIG. 6), the processing state and processing method of workpiece W (FIG. 9), and the disposition of workpiece W (FIG. 10) by checking the information about reference block 31 detected in step S103 with the data stored in storage 53.

Controller 52 further detects the inclination of plate member 24 in workpiece placing tool 20 from the center coordinates of reference block 31A, reference block 31B, and reference block 31C. Controller 52 corrects the position of each workpiece W placed on workpiece placing tool 20 based on the detected inclination of plate member 24.

Subsequently, controller 52 performs the conveyance and processing of the workpiece based on the obtained information about workpiece (S105).

Controller 52 grasps how the plurality of workpiece W exist in a spatial positions of workpiece storage area 151 using the information about the size of workpiece W and the disposition of workpiece W recognized in the previous step. For this reason, controller 52 can operate workpiece conveyance unit 161 such that workpiece W is accurately positioned at the position and orientation in which workpiece holder 172 of robot arm 165 can hold workpiece W. At this point, a positional deviation of workpiece W due to the inclination of plate member 24 is corrected in the previous step, so that workpiece holder 172 can more accurately positioned with respect to each workpiece W placed on workpiece placing tool 20.

When robot arm 165 holds workpiece W, information detector 41 may perform a step of emitting the laser light toward workpiece W to receive the reflected light. Holding failure of workpiece W by workpiece holder 172 can be prevented by determining that workpiece W does not exist during the abnormal light receiving state of the reflected light.

After workpiece conveyance unit 161 moves workpiece W from workpiece storage area 151 to processing area 141, controller 52 processes workpiece W based on the information about the processing state and the processing method of workpiece W recognized in the previous step.

The above configuration of the workpiece information recognition system according to the embodiment of the present invention will collectively be described. The workpiece information recognition system of the embodiment includes workpiece placing tool 20 capable of placing the workpiece, reference block 31 as a reference object detachably provided on workpiece placing tool 20, information detector 41 that detects the information about reference block 31, and control device 51 that receives the information about reference block 31 from information detector 41. Control device 51 includes storage 53 that stores the data on the relationship between the information about reference block 31 and the information about the workpiece and controller 52 that recognizes the information about the workpiece placed on workpiece placing tool 20 by checking the information about reference block 31 detected by information detector 41 with the data stored in storage 53.

In the workpiece information recognition system according to the embodiment of the present invention having the above configuration, since reference block 31 is detachably provided on workpiece placing tool 20, when the type of the workpiece placed on workpiece placing tool 20 is changed, reference block 31 provided on reference block 31 may be replaced with reference block 31 corresponding to the workpiece. For this reason, it is possible to easily cope with the change in the type of the workpiece.

Figure 15:
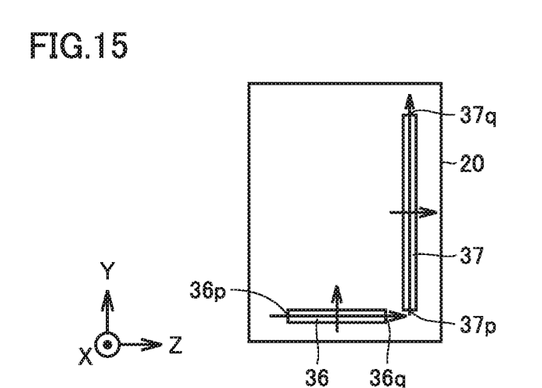
FIG. 15 is a plan view illustrating various modifications of the reference block illustrated in FIG. 12.
Figure 16:
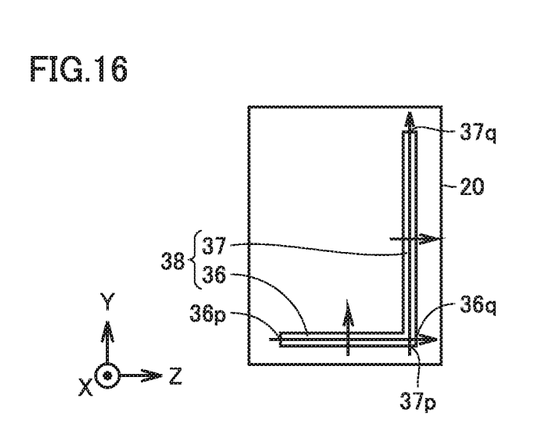
FIG. 16 is a plan view illustrating various modifications of the reference block in FIG. 12.

FIGS. 15 and 16 are plan views illustrating various modifications of the reference block in FIG. 12. Referring to FIG. 15, in the modification, a reference block 36 and a reference block 37 are provided on workpiece placing tool 20 instead of reference block 31 in FIG. 12.

Reference block 36 has an elongated shape extending along the Z-axis direction. Reference block 36 is provided along an end side of workpiece placing tool 20 (plate member 24) extending in the Z-axis direction. Reference block 37 has an elongated shape extending along the Y-axis direction. Reference block 37 is provided along an end side of workpiece placing tool 20 (plate member 24) extending along the Z-axis direction.

With this configuration, in step S103 in FIG. 11, workpiece conveyance unit 161 is operated while information detector 41 emits the laser light toward reference block 36, thereby performing the scanning with the laser light along each of the longitudinal direction (Z-axis direction) and the short direction (Y-axis direction) of reference block 36. Consequently, the coordinates of one end 36$p$ and the other end 36$q$ in the longitudinal direction of reference block 36 are detected. Workpiece conveyance unit 161 is operated while information detector 41 emits the laser light toward reference block 37, thereby performing the scanning with the laser light along each of the longitudinal direction (Y-axis direction) and the short direction (Z-axis direction) of reference block 37. Consequently, the coordinates of one end 37$p$ and the other end 37$q$ in the longitudinal direction of reference block 37 are detected.

In step S104 in FIG. 11, controller 52 detects the inclination of plate member 24 in workpiece placing tool 20 from the coordinates of one end 36$p$ and the other end 36$q$ of reference block 36 and the coordinates of one end 37p and the other end 37q of reference block 37.

Referring to FIG. 16, in the modification, a reference block 38 is provided on workpiece placing tool 20 instead of reference block 31 in FIG. 12. Reference block 38 has a shape in which reference block 36 and reference block 37 in FIG. 15 are connected to each other at a corner of workpiece placing tool 20 (plate member 24).

Even in this modification, the inclination of plate member 24 in workpiece placing tool 20 is detected by scanning reference block 36 and reference block 37 with the laser light along the Y-axis direction and the Z-axis direction.

As described above, in detecting the inclination of plate member 24, three reference blocks are not necessarily required, but two reference blocks 36, 37 or one reference block 38 may be used. The inclination of plate member 24 may be detected using at least four reference blocks.

In the embodiment, the reference block is provided on plate member 24 of workpiece placing tool 20. Alternatively, the reference block may be provided on tray 21 of workpiece placing tool 20.

The reference object in the present invention is not limited to the above solid reference block. For example, the reference object may be a sheet-shaped mirror. When the solid reference block is used as the reference object, durability of the reference object can be improved. When the sheet-shaped mirror is used as the reference object, a freedom degree of the installation location of the reference object can be increased.

The workpiece information recognition system of the present invention is not limited to the machine tool, but may be applied to various workpiece processing devices such as a workpiece measuring device and a workpiece cleaning device.

The present invention will collectively be described below. According to the present invention, a workpiece information recognition system includes a workpiece placing tool capable of placing a workpiece, a reference object detachably provided on the workpiece placing tool, an information detector configured to detect information about the reference object, and a control device configured to receive the information about the reference object from the information detector. The control device includes a storage configured to store data on a relationship between the information about the reference object and information about the workpiece and a controller configured to recognize the information about the workpiece placed on the workpiece placing tool by checking the information about the reference object detected by the information detector with the data stored in the storage.

In the workpiece information recognition system having the above configuration. When the type of the workpiece is changed, the reference object provided on the workpiece placing tool may be replaced with the reference object corresponding to the workpiece. For this reason, it is possible to easily cope with the change in the type of the workpiece.

Preferably the information about the reference object includes the information about the size, the shape, or the position of the reference object.

In the workpiece information recognition system having the above configuration, the information about the workpiece placed on the workpiece placing tool can be recognized through various pieces of information about the reference object.

Preferably the information about the workpiece includes the information about the size, the processing state, the processing method, or the disposition of the workpiece.

in the workpiece information recognition system having the above configuration, various pieces of information about the workpiece placed on the workpiece placing tool can be recognized through the information about the reference object.

Preferably the workpiece placing tool includes the plate member in which the plurality of openings into which the workpieces are inserted are provided. At least three reference objects disposed apart from one another are provided in the plate member.

In the workpiece information recognition system having the above configuration, the inclination of the plate member can be recognized through the positions of the three reference objects.

Preferably the reference object is a solid.

In the workpiece information recognition system having the above configuration, the durability of the reference object can be improved.

Preferably the workpiece information recognition system further includes the workpiece conveyance unit that conveys the workpiece placed on the workpiece placing tool. The information detector is fixed to the workpiece conveyance unit.

In the workpiece information recognition system having the above configuration, the information detector can be moved toward the reference object using the workpiece conveyance unit that conveys the workpiece.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

For example, the present invention is applied to the machine tool.

REFERENCE SIGNS LIST

20: placing tool, 21: tray, 24: plate member, 25: base plate, 26: spacer, 27: top plate, 28: opening, 31, 31A, 31B, 31C, 36, 37, 38: reference block, 36p, 37p: one end, 36q, 37q: the other end, 41: information detector, 51: control device, 52: controller, 53: storage, 100: machine tool, 115: splash guard, 121: first spindle, 122: second spindle, 123: tool spindle, 131, 132, 133, 134: center axis, 141: processing area, 151: workpiece storage area, 152: cover body, 156: drawer, 161: workpiece conveyance unit, 164: moving mechanism unit, 165: robot arm, 171: movable unit, 172, 172P, 172Q: workpiece holder, 181: turning axis, 182: rotation axis

The invention claimed is:

1. A workpiece information recognition system comprising:
a workpiece placing tool capable of placing a workpiece;
a reference object detachably provided on the workpiece placing tool;
an information detector configured to detect information about the reference object; and
a control device configured to receive the information about the reference object from the information detector, wherein the control device includes:
a storage configured to store data on a relationship between the information about the reference object and information about the workpiece; and
a controller configured to recognize the information about the workpiece placed on the workpiece placing tool by checking the information about the reference object detected by the information detector with the data stored in the storage,
the reference object is a solid,
the information about the reference object includes information about a shape of the solid, and
the solid has a different shape depending on the information about the workpiece placed on the workpiece placing tool.

2. The workpiece information recognition system according to claim 1, wherein the information about the reference object further includes information about a size, or a position of the solid.

3. The workpiece information recognition system according to claim 1, wherein the information about the workpiece includes a size, a processing state, a processing method, or disposition of the workpiece.

4. The workpiece information recognition system according to claim 1, wherein the workpiece placing tool includes a plate member in which a plurality of openings into which the workpieces are inserted is provided, and
the reference object comprises at least three reference objects, the at least three reference objects disposed apart from one another being provided in the plate member.

5. The workpiece information recognition system according to claim 1, further comprising a workpiece conveyance unit configured to convey the workpiece placed on the workpiece placing tool,
wherein the information detector is fixed to the workpiece conveyance unit.

* * * * *